(12) United States Patent
Li et al.

(10) Patent No.: US 12,013,801 B2
(45) Date of Patent: Jun. 18, 2024

(54) DEVICES, SYSTEMS, AND METHODS FOR PCIe ENDPOINT INTERRUPT

(71) Applicant: Infineon Technologies AG, Neubiberg (DE)

(72) Inventors: Lin Li, Munich (DE); Uli Kretzschmar, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/701,892

(22) Filed: Mar. 23, 2022

(65) Prior Publication Data

US 2022/0318170 A1 Oct. 6, 2022

(30) Foreign Application Priority Data

Mar. 24, 2021 (DE) ...................... 10 2021 107 336.7

(51) Int. Cl.
| | |
|---|---|
| *G06F 13/00* | (2006.01) |
| *G06F 9/355* | (2018.01) |
| *G06F 13/16* | (2006.01) |
| *G06F 13/26* | (2006.01) |

(52) U.S. Cl.
CPC .......... *G06F 13/26* (2013.01); *G06F 13/1668* (2013.01); *G06F 2213/0026* (2013.01)

(58) Field of Classification Search
None
See application file for complete search history.

(56) References Cited

U.S. PATENT DOCUMENTS

| 7,797,436 B2 * | 9/2010 | Banerjee ................. H04L 67/10 |
| | | 709/225 |
| 2008/0082713 A1 | 4/2008 | Tsuruta |
| 2017/0091013 A1 * | 3/2017 | Tallam ................ G06F 11/0745 |
| 2020/0371578 A1 * | 11/2020 | Murali ................ G06F 13/4221 |
| 2022/0318170 A1 * | 10/2022 | Li ........................... G06F 13/26 |

(Continued)

OTHER PUBLICATIONS

Stratix V Avalon-MM Interface for PCIe Solutions, May 21, 2017, Altera (Year: 2017).*

(Continued)

*Primary Examiner* — Hyun Nam
(74) *Attorney, Agent, or Firm* — Eschweiler & Potashnik, LLC

(57) ABSTRACT

The present disclosure provides a Peripheral Component Interconnect Express (PCIe) controller for a PCIe endpoint device. The PCIe controller includes: a PCIe link interface configured to receive an interrupt request message, wherein the interrupt request message is a message write transaction PCIe transport layer packet (TLP) including an address associated with the PCIe endpoint device and a data value including interrupt information; an interrupt request trigger register configured to receive the data value; a plurality of interrupt lines; and a decode logic circuit connected to the interrupt request trigger register and the plurality of interrupt lines, the decode logic circuit configured to automatically decode a plurality of data bits of the data value when received in the interrupt request trigger register and generate an interrupt signal and provide the interrupt signal on one of the plurality of interrupt lines to an interrupt handling circuit.

20 Claims, 8 Drawing Sheets

(56) References Cited

U.S. PATENT DOCUMENTS

2023/0195994 A1* 6/2023 Shen ................ G06F 30/398
716/111
2023/0394293 A1* 12/2023 Yousefzadeh ....... G06F 15/8007

OTHER PUBLICATIONS

Wikipedia.org. "Message Signaled Interrupts" Published on Dec. 25, 2020.
Texas Instruments. "J721E DRA829/TDA4VM Processors Silicon Revision" Published Dec. 2020.
Wikipedia.org "PCI Express" Published on Jan. 27, 2022.
Wikipedia.org. "Interrupt request (PC architecture)" Published on Mar. 12, 2021.

* cited by examiner

Figure 4 Interrupt propagation with the trigger request mechanism in a PCIe topology 610 — receiving, from a PCIe link interface, an interrupt request message, wherein the interrupt request message is a message write transaction PCIe transport layer packet (TLP) including an address associated with the PCIe endpoint device and a data value 620 — receiving, into an interrupt request trigger register associated with the PCIe endpoint device, the data value 630 — decoding a plurality of data bits of the data value received in the interrupt trigger register and generate an interrupt signal and providing the interrupt signal on one of a plurality of interrupt lines to an interrupt processing circuit

FIG. 6

710 — generating, by the processor, an interrupt request message to an PCIe endpoint device, wherein the interrupt request message is a message write transaction PCIe transport layer packet (TLP) including an address associated with the PCIe endpoint device and a data value to be written to an interrupt trigger register of the PCIe endpoint device.

720 — transmitting, via a PCIe link interface, the interrupt request message to the PCIe endpoint device

FIG. 7

810 — Identifying each of the PCIe endpoint devices

820 — generating, for each PCIe endpoint device, a configuration message to obtain, from a base register of a respective PCIe endpoint device, information about a memory-mapped address space associated with the respective PCIe endpoint device 830 — transmitting, to each PCIe endpoint device, the configuration message over a PCIe link interface 840 — reserving, for each PCIe endpoint device, a respective range of system address space for the memory-mapped address space associated with each respective PCIe endpoint device 850 — determining, for each PCIe endpoint device, whether the respective PCIe endpoint device includes a respective request trigger register 860 — associating, for each PCIe endpoint device having the respective request trigger register, a respective address in said respective range of system address space to the respective PCIe endpoint device, wherein the respective address corresponds to the resp8ctive request trigger register of the respective PCIe endpoint device

FIG. 8

DEVICES, SYSTEMS, AND METHODS FOR PCIe ENDPOINT INTERRUPT

REFERENCE TO RELATED APPLICATION

This application claims the benefit of German Application number 10 2021 107 336.7, filed on Mar. 24, 2021, the contents of which are hereby incorporated by reference in their entirety.

TECHNICAL FIELD

The present disclosure relates to communication among PCIe devices, e.g., to high-speed low-latency image or sensor data communications in real-time.

BACKGROUND

Various embodiments generally may relate to the field of high-speed low-latency communications among a network of PCIe devices.

BRIEF DESCRIPTION OF THE DRAWINGS

Throughout the figures in the drawings, identical or similar components are provided with the same reference signs. The figures are not necessarily drawn to scale. Various aspects of the present disclosure are explained below by means of various embodiments with reference to the following drawings.

FIG. 6 is a flow diagram of an interrupt reception process of a PCIe controller in accordance with various aspects of the present disclosure.

FIG. 7 is a flow diagram of an interrupt signaling process of a PCIe device in accordance with various aspects of the present disclosure.

FIG. 8 is a flow diagram of a memory map configuration process of a PCIe root complex device in accordance with various aspects of the present disclosure.

DETAILED DESCRIPTION

Figure 1:
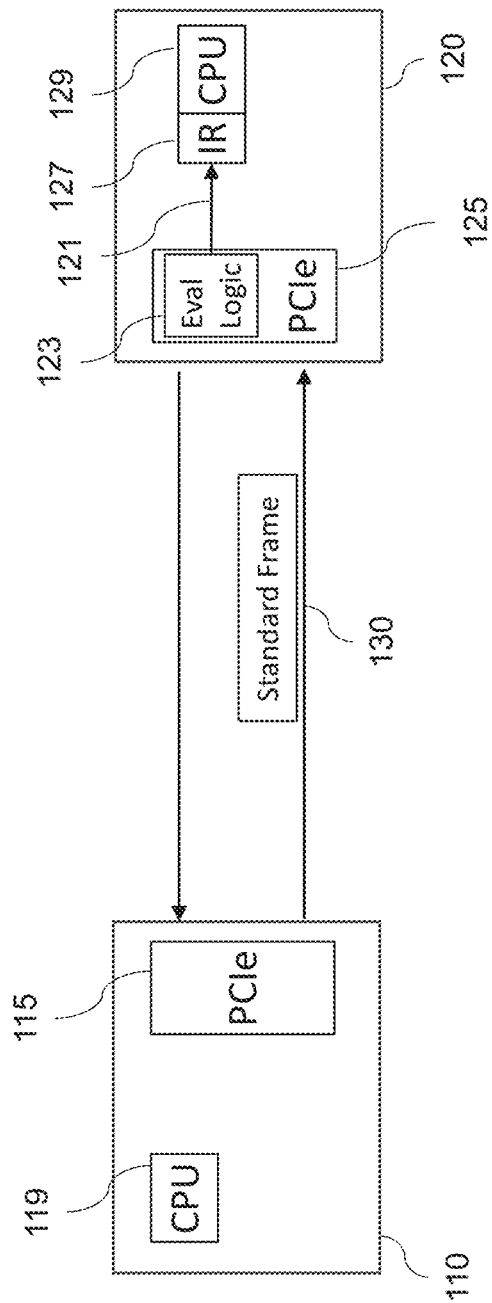
FIG. 1 is a block diagram illustrating an example of a request trigger mechanism for supporting endpoint interrupts in accordance with various aspects of the present disclosure.

The following detailed description refers to the accompanying drawings that show, by way of illustration, example details and aspects in which the present disclosure may be practiced. The same reference numbers may be used in different drawings to identify the same or similar elements.

In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The PCIe (Peripheral Component Interconnect Express) bus architecture is a high-speed serial interface widely applied in PCs, servers and mobile communication devices. The high-performance bus may be used to interconnect peripheral devices in mobile, desktop, workstation, server, embedded computing and communication platforms. For example, some autonomous vehicles use a PCIe bus to connect various sensors mounted in vehicles. The PCIe bus architecture provides chip-to-chip interconnect and board-to-board interconnect via cards and connectors compliant with the PCIe bus protocol. The PCIe bus architecture is implemented using switched-based technology to interconnect two or more devices. The PCIe bus includes one or more serial point-to-point links. Communication over each link is formatted based on a packet-based transaction communication protocol.

In a conventional PCIe topology, a PCIe host device (root complex) may be connected to many PCIe devices (endpoints) via a switch or a switching fabric. When an endpoint device (e.g., processor of the endpoint device) needs to request attention (e.g., to perform a data transfer with another endpoint device) from the host device (e.g., processor of the host device), the endpoint device may cause its PCIe controller to send an interrupt to the PCIe controller of the host device (e.g., root complex). The PCIe bus specification provides three interrupt mechanisms, including legacy interrupts (INTx), Message Signaled Interrupts (MSI) and MSI Extended Interrupts (MSI-X). The root complex includes an interrupt controller that is responsible for the reception of interrupts while the PCIe controllers of the endpoints send out interrupt requests. Therefore, in a conventional PCIe topology, the host device must be involved in the coordination or mediation of transactions between endpoint devices.

Nowadays, PCIe devices are increasingly becoming more intelligent and more complicated due to the high demand of computation power. This trend happens not only to the root complex devices (e.g., host devices) but also to the endpoint devices (e.g., peripheral devices). Many endpoint devices are SoC devices that have the ability to process interrupts from other PCIe devices connected via the PCIe bus. However, interrupt reception by endpoint devices is not supported by the current PCIe specification (e.g., PCIe 5.0). Thus, data transfers between PCIe endpoints must be facilitated by the interrupting the root complex device. As data transfers from PCIe endpoints to PCIe endpoints (P2P) are commonly used, providing interrupt processing by endpoint devices would reduce the number of interrupts to the root complex device, thereby reducing latency of data transfers because the root complex is not necessarily interrupted each time there is a data transfer between endpoints, if interrupts to endpoints are supported. However, a way to trigger interrupts to PCIe endpoints in an efficient and reliable way (low latency) and at the same time being compatible with the existing PCIe bus architecture has not been found.

The present disclosure provides an improvement of the interrupt system of current PCIe 5.0 specification. According to the PCIe 5.0 specification, only the root complex (RC) is configured to receive interrupts. The RC can process all three types of interrupts provided in the PCIe specification including INTx, MSI and MSI-X interrupts. The transmission of interrupts to endpoint devices and the reception of interrupts by endpoint devices (EPs) are not defined by the PCIe specification. However, as endpoint devices start to process more real-time data, there is envisioned a need to improve latency for data transfers over a PCIe bus architecture. Allowing endpoint devices that have the processing capabilities to handle interrupts to receive interrupts may reduce latency, because it would facilitate endpoint-to-endpoint data transfers without having to interrupt the root complex at the host device.

The present disclosure provides a new interrupt direction in addition to the interrupt direction as defined in the PCIe 5.0 specification. That is, a PCIe endpoint device may also receive interrupts in addition to initiating interrupts. This is possible because the PCIe specification does not consider the transmission of interrupts to an endpoint device, neither from root complex to endpoint, nor from endpoint to endpoint. Accordingly, there is an opportunity to provide root complex to endpoint interrupts and endpoint to endpoint interrupts that would be compatible with various versions of the PCIe specification.

The present disclosure describes circuitry and procedures to provide a PCIe endpoint interrupt system that is backwards compatible with the PCIe bus specification. By way of example, this disclosure provides procedures and/or circuitry for a root complex of a host device or a PCIe controller of an endpoint device to format and transmit interrupts to a PCIe endpoint device and/or receive and extract interrupts at an PCIe endpoint device. This disclosure describes procedures for a root complex of a host device to facilitate point-to-point interrupts between two endpoint devices. A PCIe device including the circuitry and configured to perform the procedures described herein can interoperate with existing PCIe devices.

In particular, the present disclosure describes a special backwards compatible mechanism that provides and uses a special interrupt request trigger register to support in-band interrupt message reception by a PCIe device configured as an endpoint. That is, the present disclosure provides a backwards compatible interrupt mechanism that involves one PCIe device (e.g., the interrupt initiator) sending to another PCIe endpoint device (e.g., the interrupt receiver) an in-band interrupt request using a standard PCIe packet (e.g., MSI, MSI-X, or Message Write Request (MWr) Transaction Layer Packet (TLP)) to write to the special request trigger register for interrupt signaling. The interrupt request trigger register may be included only in a PCIe endpoint device configured to receive interrupts from another PCIe endpoint device. The interrupt request trigger register need not be included in a PCIe endpoint device configured to transmit interrupts to another PCIe endpoint device.

Examples of the present disclosure describe signaling between two PCIe endpoints that facilitates a more efficient data transfer between the two PCIe endpoints. Examples of the present disclosure also describe procedures that enable a PCI endpoint device to receive and process interrupts and enable any PCIe device to send an interrupt to a PCIe endpoint device.

An endpoint device supporting the request trigger mechanism to receive interrupts includes circuitry to receive and process a standard memory write packet or frame including interrupt information, e.g., including at least one of MSI, MSI-X, and MWr TLP. The request trigger mechanism is achieved by adding at least one interrupt request trigger register to the PCIe controller of the endpoint device. The address of the at least one interrupt request trigger register is located in the memory space allocated to the endpoint device and it can be accessible by using normal PCIe memory write requests (e.g., MWr TLP). The memory space of the endpoint device may be defined based on the range information of base address register (BAR) of the endpoint device, as specified in the PCIe 5.0 specification. The request trigger mechanism is compatible with MSI and MSI-X interrupt messages because the structure of an MSI or MSI-X packet is the same as the structure of an MWr TLP packet. For example, the one interrupt request trigger register may also be memory mapped to be also accessible by MSI and/or MSI-X packets. Alternatively, there may be multiple interrupt request trigger registers. For example, there may be three dedicated registers including an interrupt request trigger register for MWr TLP packets, an interrupt request trigger register for MSI packets, and an interrupt request trigger register for MSI-X packets.

The number of inbound interrupts mapped to each internal interrupt of the interrupt handler of the endpoint device is implementation specific. It can be n to m mapped, where m and n are integers and m may be less than or equal to n. That means, for example, 32 inbound interrupts may be mapped to 32 internal interrupts to the interrupt handler. Or the number of inbound interrupts may be merged by an OR logic so that the number of internal interrupts to the interrupt handler may be reduced.

A host device may allocate and configure the memory space of an endpoint device to allow reception of memory write packets (e.g., MWr TLP, MSI, MSI-X) at the at least one interrupt request trigger register. For example, the at least one interrupt request trigger register of a respective endpoint device may be memory mapped so as to be publicly accessible via the PCIe switch fabric. The memory space in which the at least one interrupt request trigger register is located can be accessible from a remote device (e.g., another endpoint device) via a memory write packet. With respect to the request trigger mechanism, a host device can configure at least one address of a respective endpoint device in a host memory map table so that the at least one address for the respective endpoint in the host memory map table points to the address of the at least one interrupt request trigger register of the respective endpoint device. For each respective endpoint device having the request trigger mechanism, the host device can configure a respective at least one address in the host memory map table to direct interrupt messages to the respective endpoint device. Accordingly, one endpoint device can know the address of the least one interrupt request trigger register of another endpoint device and be able to utilize the request trigger mechanism to trigger an interrupt at the other endpoint device by transmitting a memory write packet to the request trigger register of the other endpoint device and writing to the interrupt request trigger register a data value included in the memory write packet, the data value may correspond to an interrupt signal to be triggered.

Once the data value of the memory write packet is received by the request trigger register, the interrupt generation process is only based on the hardware decode logic and thus provides a predictable interrupt latency, compared to triggering interrupts via bus transactions, where the latency may differ depending on the bus load.

The present disclosure provides an interrupt request trigger mechanism that has significant advantages because there is no need for special evaluation logic circuitry and/or procedure at the device level of each PCIe endpoint device for inspecting or monitoring the content (e.g., address and/or data) of received packets for an interrupt signal. The provided request trigger mechanism allows individual PCIe endpoint devices to optionally receive interrupts, even if PCIe endpoint devices in general are agnostic to receiving interrupts. That is, PCIe endpoint devices having the interrupt request trigger register are backwards compliant with conventional PCIe endpoint devices. For example, PCIe endpoint devices not having the interrupt request trigger register may still interoperate with the PCIe endpoint devices having the request trigger register. Additionally, PCIe endpoint devices not having the interrupt request trigger register may further be configured to send interrupts with only a software update even if they cannot receive interrupts. The present disclosure provides that special evaluation logic is only connected to the interrupt request trigger register which is specially tailored for receiving messages that are interpreted as interrupts. This approach may easily accommodate a CPU interrupt reception and processing system at an endpoint device. For example, after a data value that is received as an in-band PCIe interrupt message is written to the request trigger register, the evaluation logic circuitry provided in the PCIe controller automatically converts or decodes the data value into a requested trigger signal and provides the requested trigger signal on a corresponding one of a plurality of trigger lines to a conventionally designed interrupt router circuitry or interrupt handler circuitry for interrupt processing by a CPU of a host device.

FIG. 1 is a block diagram illustrating an example of a request trigger mechanism for supporting endpoint interrupts in accordance with various examples of the present disclosure. The request trigger mechanism involves a PCIe device sending a packet including interrupt information to a PCIe endpoint device having a request trigger register.

The packet including interrupt information may be a standard memory write packet or frame and may be transmitted as any other standard memory write packet or frame would be transmitted. A standard packet or frame provides cross device functionality and backward compatibility. For example, the standard memory write packet or frame indicating an interrupt request may be a Memory Write Request TLP packet addressed to a request trigger register of the PCIe endpoint device. The standard memory write packet or frame including interrupt information may also be a standard MSI or MSI-X packet and may be transmitted as any other standard MSI or MSI-X packet would be transmitted except that it can also be addressed to a PCIe endpoint device. For example, the MSI or MSI-X packet may also be addressed to a request trigger register of the PCIe endpoint device. The MWr TLP, MSI, and MSI-X packets have the same structure. The packet should not have an arbitrary format.

A request trigger register at the PCIe endpoint device is configured to be in memory-mapped memory space and is accessible for direct writing. The PCIe endpoint device may include evaluation logic circuitry coupled to the request trigger register that automatically decodes the content written to the request trigger register. That is, the evaluation logic circuitry only decodes the content of a standard memory write packet addressed to the request trigger register. The evaluation logic circuitry does not have to inspect or monitor each and every standard memory write packet for interrupt information.

Referring to FIG. 1, for simplicity, only the interrupt initiator and the interrupt recipient/processor are shown. For example, an application running on a CPU 119 of a first PCIe device 110 would like to request the attention of an application running on a CPU 129 of a second PCIe device 120.

As shown in FIG. 1, the first PCIe device 110 initiates an interrupt request by transmitting a packet 130 to the second PCIe device 120. The packet 130 may be a standard memory write transaction layer packet defined in the PCIe specification. The packet 130 may include interrupt triggering information which may identify a particular interrupt of the second PCIe device 120 to be triggered. The first PCIe device 110 may be a root complex device (e.g., a host device) or an endpoint device. As the interrupt initiator, the first PCIe device 110 may include a CPU/processor 119 and a PCIe controller 115. The CPU/processor 119 may be a main processor of the first PCIe device 110 and may be configured to generate the interrupt request contained in packet 130. The PCIe controller 115 may have the same hardware circuitry as PCIe controllers compliant with PCIe 5.0, however the PCIe controller 115 may have additional logic implemented as software to support generating an interrupt to another endpoint device. In a root complex, the PCIe controller 115 may be referred to as a PCIe bridge.

The second PCIe device 120 receives and processes the interrupt request contained in packet 130. The second PCIe device 120 is an endpoint device. As the interrupt recipient, the second PCIe device 120 may include a CPU/processor 129, an interrupt router or handler circuitry 127, and a PCIe controller 125 having evaluation logic circuitry 123. The PCIe controller 125 may be configured to receive the interrupt request message contained in packet 130. The PCIe controller 125 may include an interrupt request trigger register (not shown in FIG. 1) for storing the interrupt triggering information contained in packet 130. The evaluation logic circuitry 123 may be tailored for decoding the interrupt triggering information written to the interrupt request trigger register. For example, the evaluation logic circuitry 123 may convert the interrupt triggering information stored in the interrupt request trigger register into an interrupt signal 121 to be provided to the interrupt router or handler circuitry 127. The evaluation logic circuitry 123 may be connected to the interrupt request trigger register and be configured to automatically decode the interrupt triggering information received in the interrupt request trigger register. The evaluation logic circuitry 123 may be connected to the interrupt router or handler circuitry 127 via one or more interrupt lines, e.g., hardwired traces. The evaluation logic circuitry may provide interrupt signal 121 to the interrupt router or handler circuitry 127 on one of the interrupt lines in accordance with the decoded interrupt triggering information. The interrupt router or handler circuitry 127 may receive the respective interrupt signal on one of its hardwired interrupt traces and initiate a corresponding interrupt routine at the second PCIe device. The interrupt router or handler circuitry 127 may assist in a memory context change to schedule and prepare the CPU/processor 129 to process the interrupt request. The CPU/processor 129 may be a main processor of the second PCIe device 120 and may be configured to process the interrupt request contained in packet 130.

Figure 2:
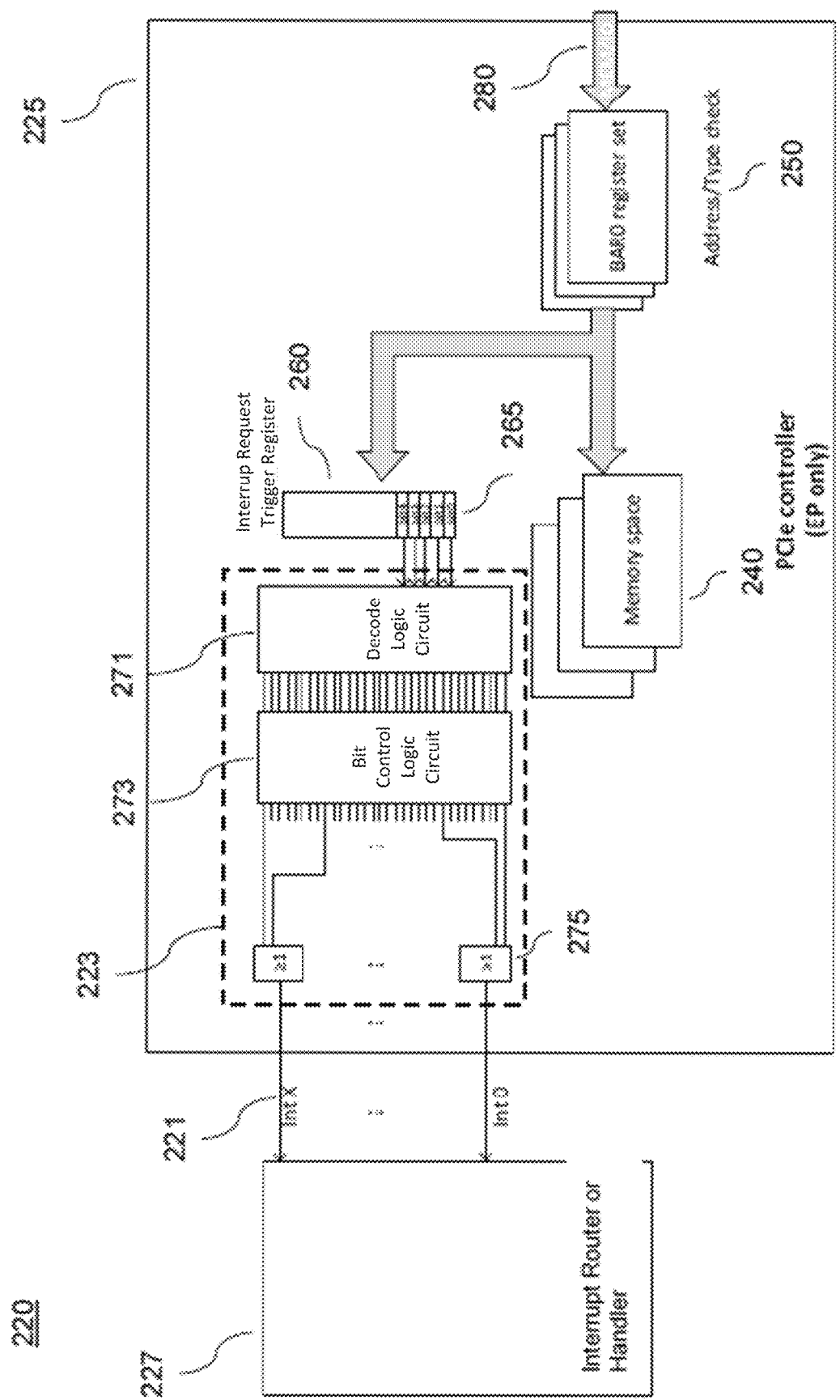
FIG. 2 is a schematic diagram illustrating a more detailed view of the PCIe controller of FIG. 1 in accordance with various aspects of the present disclosure.

FIG. 2 is a schematic diagram illustrating a more detailed view of the PCIe controller 225 of FIG. 1 in accordance with various aspects of the present disclosure. As shown in FIG.

2, a PCIe device 220 is an endpoint device configured to receive and process interrupts. The PCIe endpoint device 220 may include a PCIe controller 225 having evaluation logic circuitry 223, at least one interrupt request trigger register 260, base address register set (BAR) 250, memory space 240, a plurality of interrupt signal lines 221, and PCIe link interface 280. The PCIe link interface 280 includes a point-to-point PCIe bus link that may be connected to a another PCIe device 210 via a PCIe switch or fabric of PCIe switches (not shown in FIG. 2). The another PCIe device 210 may be a host device or another endpoint device. The PCIe link interface 280 include a physical interface for receiving packet 230 transmitted as a differential signal at the physical layer. The packet 230 may be a standard PCIe memory write transaction packet (e.g., MWr TLP or MSI/MSI-X packet) that contains an address value and a data value. The address value may be an address in a PCIe memory space 240 associated with PCIe endpoint device 220. The data value may include interrupt information for triggering an interrupt for processing at PCIe endpoint device 220. The BAR 250 is also used to help define the allocated memory space 240 associated with the second PCIe device. The interrupt request trigger register 260 is mapped to a location in the PCIe memory space 240 and thus is accessible via normal PCIe memory writes and reads.

Figure 3:
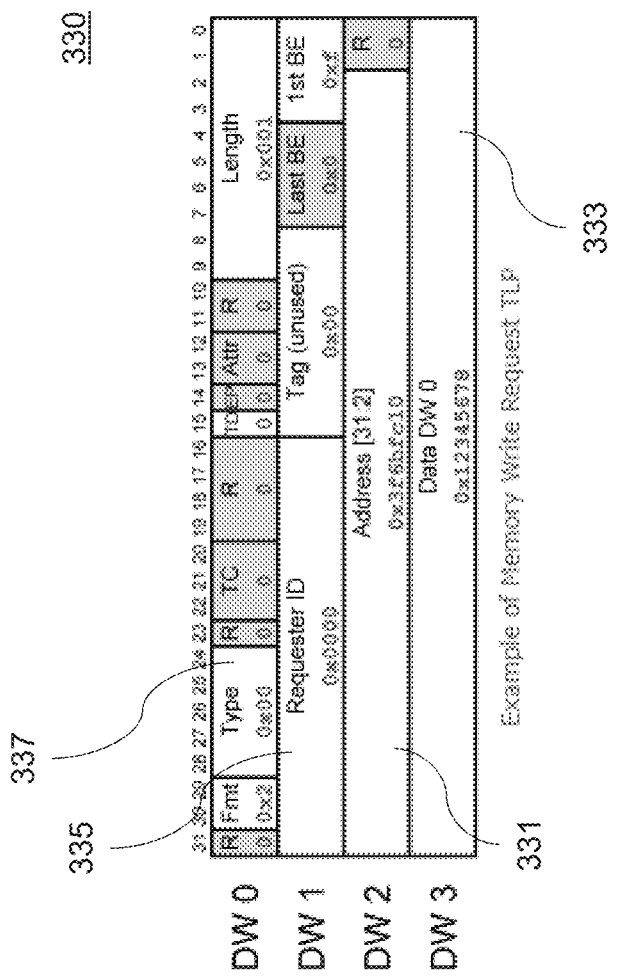
FIG. 3 is a diagram illustrating a frame structure of a standard PCIe memory write packet in accordance with various aspects of the present disclosure.

FIG. 3 is a diagram illustrating a frame structure of a standard PCIe memory write request packet 330 in accordance with various aspects of the present disclosure. The standard PCIe memory write request packet 330 may be used to signal an interrupt to a PCIe endpoint device. The standard PCIe memory write request packet 330 may include an address field 331, a data field 333, a requester ID field 335, and a type field 337. For example, a standard PCIe memory write request packet 330 sent from a PCIe device to a PCIe endpoint device to trigger an interrupt at the PCIe endpoint device may include in address field 331 an address associated with the interrupt request trigger register of the PCIe endpoint device and in data field 333 interrupt information to be written to the interrupt request trigger register. The interrupt information may be information identifying a particular interrupt to trigger (e.g., interrupt index). The standard PCIe memory write request packet 330 may also include in requester ID field 335 information identifying the PCIe device requesting the interrupt, and in type field 337 information identifying the type of packet. For example, the type of packet may be a MWr TLP, MSI, or MSI-X.

Referring again to FIG. 2, for example, the PCIe endpoint device 220 may include only one interrupt request trigger register which is configured to receive a data value from an MWr TLP, MSI, or MSI-X packet. That is, when the PCIe device 110 requesting an interrupt is a host device, the packet 230 may be an MWr TLP packet directed to PCIe endpoint device 220. The packet 230 may contain an address value associated with the one interrupt request trigger register 260 and a data value identifying a particular host interrupt to be written to the interrupt request trigger register 260. When the PCIe device 110 requesting an interrupt is an endpoint device, the packet 230 may be an MSI or MSI-X packet directed to PCIe endpoint device 220. Similarly, the packet 230 may also contain an address value associated with the one interrupt request trigger register 260 and a data value identifying a particular endpoint interrupt to be written to the interrupt request trigger register 260. The single interrupt request trigger register 260 may be mapped to PCIe memory space 240 and may be accessible so as to be written with the data value contained in the packet 230 from either a host device or another endpoint device. In some embodiments, the data value may identify a particular interrupt line of a respective PCIe device for triggering and/or the identity of the interrupt requester. For example, interrupt indices 0-3 may be assigned to the host device, interrupt indices 4-10 may be assigned to one endpoint, and interrupt indices 11-20 may be assigned to another endpoint, and so on. Accordingly, depending on which interrupt index is triggered (i.e, indicated by the data value of the standard PCIe memory write request packet 330), it is possible to know or distinguish which PCIe device requested an interrupt. For example, interrupt index 0 from one PCI device and interrupt index 4 from another PCIe device may be associated with the same interrupt routine at the endpoint device receiving the interrupt message. When indices or sets of indices are associated with particular PCIe devices, the requester ID field 335 of the standard PCIe memory write request packet 330 may be blank or omitted. The determination and assignment of the indices may be facilitated by the host device and communicated to the respective endpoints.

All of the bits of the data value written to the interrupt request trigger register 260 may be used to identify a particular interrupt for triggering. In some examples, only some of the bits of the data value written to the interrupt request trigger register 260 may be used to identify a particular interrupt for triggering. Referring to FIG. 2, for example, the interrupt request trigger register 260 may be a 5-bit register, where bits 0-4 of the data value may be written to bits 0-4 of the interrupt request trigger register 260. The value written into the 5-bit interrupt request trigger register 260 may be used to identify one of thirty-two possible interrupt lines for triggering. The size of the interrupt request trigger register is not limited to a 5-bit register. In other examples, the interrupt request trigger register may be larger or smaller.

For example, the evaluation logic circuitry 223 may include decode logic circuit 271 which may include a combinatorial logic circuit and the bit control logic circuit 273 which may include a bit control logic circuit. The evaluation logic circuitry 223 may use the information written to the interrupt request trigger register 260 to enable and/or disable an interrupt signal line 221.

For example, the decode logic circuit 271 may enable and/or disable one or more output signal lines from the decode logic circuit 271 to the bit control logic circuit 273 based on the information contained in the interrupt request trigger register 260. In some examples, the decode logic circuit 271 may be a binary (e.g., n-to-up $2^n$) line decoder. For example, in the case of a 5-bit interrupt request trigger register, the decode logic circuit 271 may include a 5-to-32 line decoder. The decode logic circuit 271 may have 5 input signal lines and 32 output signal lines. The decode logic circuit 271 may receive a 5-bit binary number from the interrupt request trigger register 260 and decode the 5-bit binary number into an index value represented by the value of the binary number. The 32 output signal lines may be indexed from 0 to 31. Based on the decoded index number, the decode logic circuit 271 may enable the output signal line corresponding to the decoded index number. For example, if the interrupt request trigger register has a value of 0b00100. The binary 0b00100 equals 4 so the output signal line from the decode logic with the index 4 is active while the others will be inactive. The decode logic circuit 271 is not limited to a binary line decoder. In some examples, the decode logic circuit 271 may include a one-to-one decoder.

For example, the bit control logic circuit 273 may enable and/or disable an interrupt signal line 221 connected to an interrupt handler 227. The bit control logic circuit 273 may include interrupt signal generation control logic. In some examples, the bit control logic circuit 273 may contain status information of each of the output signals from the decode logic circuit 271 and use the status information to control the generation of the interrupt signals on the interrupt signal lines 221. There may be a set of bits for each output signal from the decode logic circuit 271. Each set of bits includes of a status bit, a clear bit and a mask bit. The status bit may indicate whether the respective output signal is active or inactive. The mask bit may indicate whether a respective logical interrupt will be generated when the status changes from inactive to active. The clear bit may be used to clear the status bit. For example, when application software (SW) in the interrupt handler 227 finishes the handling of an interrupt signal the clear bit may be asserted.

In some examples, the logical interrupts may correspond to the hardwired interrupts on a one-to-one base. In some examples, the evaluation logic circuitry 223 may include one or more OR logic circuitry 275 to aggregate logical interrupts into one or more hardwired interrupts 221.

Alternatively, in some examples, a PCIe endpoint device configured to receive and process interrupts from another PCIe endpoint device may include multiple interrupt request trigger registers. For example, a first interrupt request trigger register 260a, a second interrupt request trigger register 260b, and a third interrupt request trigger register 260c. These registers are similar to the interrupt request trigger register 260. The first interrupt request trigger register 260a may be configured to receive MWr TLP packets including interrupt information from the host device and/or another endpoint. The second interrupt request trigger register 260b may be configured to receive MSI packets including interrupt information from another endpoint. The third interrupt request trigger register 260c may be configured to receive MSI-X packets including interrupt information from another endpoint. That is, the second interrupt request trigger register 260b functions as the MSI register and the third interrupt request trigger register 260c functions as the MSI-X register of a respective PCIe endpoint device. As such, the MSI and MSI-X registers of a respective PCIe endpoint device may also be configured by the host device to be mapped to locations in PCIe memory space and therefore are also accessible via mechanisms for normal PCIe memory writes and reads. For example, an MSI interrupt message packet is essentially a memory write request that is by default addressed to the MSI register of the respective endpoint device. The MSI packet and may be addressed to a second interrupt request trigger register 260b mapped to PCIe memory space and may access the interrupt request trigger register 260b so as to write the data value of the packet therein. The standard PCIe memory write request packet 330 may also be an MSI-X packet and may be addressed to a third interrupt request trigger register 260c mapped to PCIe memory space and may access the interrupt request trigger register 260c so as to write the data value of the packet therein.

A PCIe endpoint device configured to receive and process interrupts from another PCIe endpoint may have a decode logic circuitry that includes a decoder for each of the first, second, and third interrupt request trigger registers.

Figure 4:
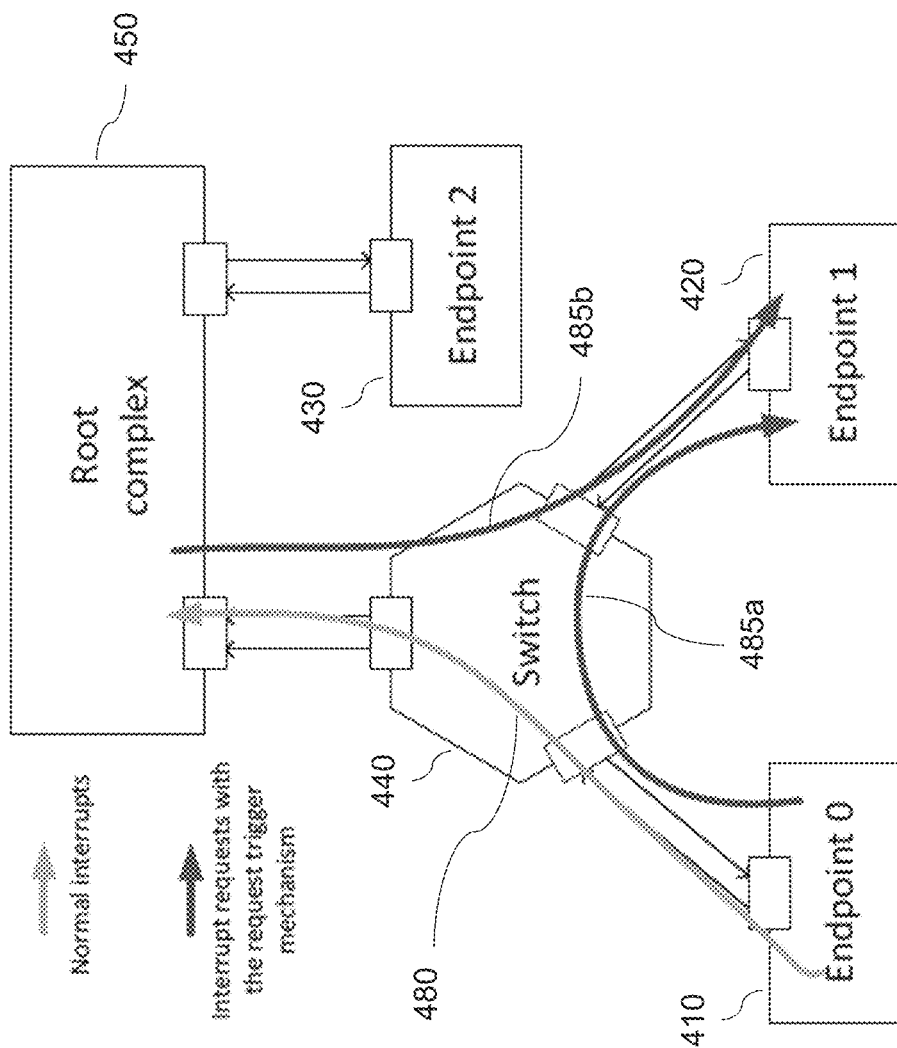
FIG. 4 illustrates an example PCIe topology and how interrupt requests are communicated among several PCIe devices in accordance with various aspects of the present disclosure.

FIG. 4 illustrates an example PCIe topology and how interrupt requests are communicated among several PCIe devices. Referring to FIG. 4, the root complex 450 is contained in a host device of the topology. PCIe endpoint devices (e.g., endpoint_0, endpoint_1, and endpoint_2) may be connected to the root complex 450 directly via a point-to-point PCIe serial link or through one or more switches 440 (e.g., switch fabric) via a series of point-to-point PCIe serial links. The PCIe topology in accordance with various aspects of the present disclosure may include a root complex device, conventional PCIe endpoint devices (e.g., endpoint_2), endpoint devices that can trigger other endpoint devices, but cannot receive a trigger interrupt (e.g., endpoint_0), and endpoint devices that can trigger other endpoint device and can receive trigger interrupts (i.e., includes the request trigger mechanism) (e.g., endpoint_1). As shown in FIG. 4, normal interrupts can only be sent to the root complex. Conventional endpoint devices, e.g., endpoint_2 430, are not able to receive interrupts according to PCIe specification. Software modified only endpoint devices, e.g., endpoint_0 410, may be configured to send interrupts to another endpoint. However, hardware modified endpoint devices, e.g., endpoint_1 420, supporting the request trigger mechanism are capable of receiving interrupts from other endpoints, e.g., endpoint_0 410, and from the root complex 450. Referring to FIG. 4, for example, an interrupt request can be sent from endpoint_0 to endpoint_1 via MSI or MSI-X packets. The root complex can also send an interrupt request to endpoint_1 via a memory write MWr TLP packet. The request trigger mechanism works as a complementary and compatible mechanism to the existing PCIe specification, facilitating the synchronization and communication of several devices in a PCIe topology.

An example memory mapped space of the PCIe devices of the PCIe topology of FIG. 4 is now described with reference to Table 1. Table 1 is an example of a system memory space (e.g., memory map) of the root complex and plurality of endpoints with varying levels of endpoint interrupt support. The system memory space includes memory space of the root complex and the memory spaces of the plurality of endpoints based on each endpoint device having only one interrupt request trigger register.

TABLE 1

Example of a System Memory Space (e.g., Memory Map)
(single interrupt request trigger register)

| | |
|---|---|
| Address Space of Host Device (System Memory Space) | 0x0000_0000::0xFFFF_FFFF |
| Base Address of Root Complex (RC BA) | e.g., 0x0000_0000 |
| RC MSI Trigger Register | RC BA + offset for MSI Trigger Register (e.g., 0x0000_0000 + 0x20, i.e. 0x0000_0020) |
| RC MSI-X Trigger Register | RC BA + offset for MSI-X Trigger Register (e.g., 0x0000_0000 + 0x40, i.e. 0x0000_0040) |
| Base Address of Endpoint_0 (EP0 BA) (EP0 supports endpoint interrupt signaling but does not support endpoint interrupt handling) | e.g., 0x1000_0000 |
| Base Address of Endpoint_1 (EP1 BA) (EP1 supports endpoint interrupt signaling and handling) | e.g., 0x1020_0000 |
| EP1 Request Trigger Register (for MWr TLP, MSI, and MSI-X packets) | EP1 BA + offset for Request Trigger Register (e.g., 0x1020_0000 + 0x60, i.e. 0x1020_0060) |
| Base Address of Endpoint_2 (EP2 BA) (EP2 does not support endpoint interrupt signaling or handling) | e.g., 0x1040_0000 |

Another example of memory mapped space of the PCIe devices of the PCIe topology of FIG. 4 is now described with reference to Table 2. The system memory space includes memory space of the root complex and the memory spaces of the plurality of endpoints based on each endpoint device having a plurality of interrupt request trigger registers.

TABLE 2

Example of a System Memory Space (e.g., Memory Map) (multiple interrupt request trigger registers)

| | |
|---|---|
| Address Space of Host Device (System Memory Space) | 0x0000_0000::0xFFFF_FFFF |
| Base Address of Root Complex (RC BA) | e.g., 0x0000_0000 |
| RC MSI Trigger Register | RC BA + offset for MSI Trigger Register (e.g., 0x0000_0000 + 0x20, i.e. 0x0000_0020) |
| RC MSI-X Trigger Register | RC BA + offset for MSI-X Trigger Register (e.g., 0x0000_0000 + 0x40, i.e. 0x0000_0040) |
| Base Address of Endpoint_0 (EP0 BA) (EP0 supports endpoint interrupt signaling but does not support endpoint interrupt handling) | e.g., 0x1000_0000 |
| Base Address of Endpoint_1 (EP1 BA) (EP1 supports endpoint interrupt signaling and handling) | e.g., 0x1020_0000 |
| EP1 MSI Request Trigger Register | EP1 BA + offset for MSI Request Trigger Register (e.g., 0x1020_0000 + 0x20, i.e. 0x1020_0020) |
| EP1 MSI-X Request Trigger Register | EP1 BA + offset for MSI-X Request Trigger Register (e.g., 0x1020_0000 + 0x40, i.e. 0x1020_0040) |
| EP1 MWr TLP Request Trigger Register | EP1 BA + offset for MWr TLP Request Trigger Register (e.g., 0x1020_0000 + 0x60, i.e. 0x1020_0060) |
| Base Address of Endpoint_2 (EP2 BA) (EP2 does not support endpoint interrupt signaling or handling) | e.g., 0x1040_0000 |

The host device configures the system memory map. When an endpoint device (e.g., EP X) is first connected to a PCIe bus, the root complex (RC) reads information contained in the BAR register of the endpoint device (e.g., EP X) and assigns a base address for the newly connected endpoint device (e.g., EP X) based on this information. The base address of the endpoint device is an address beyond actual host device memory. For example, when the size of the host device memory is 0x1000_0000, the last address of the host device memory is 0x0FFF_FFFF). Thus, the root complex may assign an address starting at 0x1000_0000 to endpoint devices.

The information in the BAR register of an endpoint device may indicate a size of the PCIe memory space requested by the endpoint device. The root complex may allocate a portion of addresses in system memory space for the endpoint device based on the requested memory size information in the BAR register. (e.g., 0x0020_0000). If the requested size by the endpoint is too large for the system, the root complex (RC) cannot fulfill it and may only assign what is available. For example, the EP requests 4 GB but the RC may only assign 2 GB.

The information in the BAR register of the endpoint device may also indicate how PCIe memory space may be assigned to various endpoint registers necessary to the operation of interrupt reception and handling by the endpoint device. For example, an endpoint device that supports the request trigger mechanism may also include a single interrupt request trigger register for receiving MWr TLP, MSI, and MSI-X interrupt request packets or a plurality of interrupt request trigger registers (e.g., an MWr TLP register, an MSI register and an MSI-X register) for receiving MWr TLP, MSI, and MSI-X interrupt request packets, respectively. In some examples, the MSI register and the MSI-X register may be a second interrupt request trigger register and a third interrupt request trigger register, respectively, similar to the interrupt request trigger register for MWr TLP. Addresses for endpoint registers are configured by the root complex during runtime. For example, the root complex may assign PCIe memory space to a register based on information in the BAR register of the endpoint defining a register location based an offset relative to the base address of the endpoint. Each offset corresponds to where the particular register can be found and addressed. For example, referring to Table 1, if an endpoint device (e.g, EP 1) with one interrupt request trigger register is assigned a base address of 0x1020_0000 and the offset for the interrupt request trigger register is 0x60, the memory address at which the interrupt request trigger register would be accessible would be 0x1020_0060. For example, referring to Table 2, if an endpoint device (e.g, EP 1) with multiple interrupt request trigger registers is assigned a base address of 0x1020_0000 and the offsets for the MSI request trigger register, the MSI-X request trigger register, and the MWr TLP request trigger register are 0x20, 0x40, and 0x60, respectively, the memory addresses at which these registers would be accessible would be 0x1020_0020, 0x1020_0040, and 0x1020_0060, respectively.

In a typical case, once a base address for an endpoint device is assigned, the locating of specific registers of an endpoint device may be automatically handled. For example, the MWr TLP/MSI/MSI-X packet may simply be addressed to the base address of the endpoint device. In examples where the endpoint device has only one interrupt request trigger register, once the MWr TLP/MSI/MSI-X packet arrives at the addressed endpoint device, the PCIe controller of the endpoint device can determine that the packet is an MWr TLP/MSI/MSI-X packet and can write the data value of the MWr TLP/MSI/MSI-X to the interrupt request trigger register because the offset of the interrupt request trigger register is predefined. In examples where the endpoint device has a plurality of interrupt request trigger register s, once the MWr TLP/MSI/MSI-X packet arrives at the addressed endpoint device, the PCIe controller of the endpoint device can determine that the packet is an MWr TLP/MSI/MSI-X packet and can write the data value of the MWr TLP/MSI/MSI-X to the respective MWr TLP/MSI/MSI-X request trigger register because the offsets of the MWr TLP/MSI/MSI-X registers are predefined.

Normal MSI Interrupt from EP 0 to RC.

In the case of an interrupt from an endpoint to a root complex, for example, EP 0 to RC, a normal MSI interrupt message may be used. For example, EP 0 410 may send a normal MSI packet 480 to the RC 450 pursuant to the PCIe specification. The MSI packet 480 may be addressed to the base address of the RC (e.g., 0x0000_0000) and the data value may contain information identifying one or more (e.g. 1 to 32) possible interrupts that can be serviced by the CPU of the RC. The RC may receive the MSI packet and determine which interrupt service routine the CPU has to execute. The RC may prepare the CPU for a context change and servicing of the interrupt request. Alternatively, the MSI packet 480 may be addressed to the RC's MSI trigger register (e.g., 0x0000_0020).

Special MSI Interrupt from EP 0 to EP 1

In the case of an interrupt from a first endpoint to a second endpoint, for example, EP 0 to EP1, a specially addressed MSI interrupt may be used. For example, the MSI packet may be addressed to a interrupt request trigger register of EP 1 and contain identification information corresponding to one of a plurality of possible interrupts that can be serviced by EP 1. For example, EP 0 410 may send a specially addressed MSI packet 485*a* addressed to EP 1 420. In order for EP0 410 to prepare the specially addressed MSI packet 485*a* for EP1 420, EP 0 410 must obtain the address of EP 1 420.

In this connection, an RC in addition to maintaining a memory map of system memory space of each added endpoint device, must also maintain information indicating whether a particular endpoint device supports EP interrupt servicing. The RC may then provide this information to the endpoints that at least support interrupt signaling to another endpoint. In this case, EP 0 can know EP 1's base address and EP 0 can send EP 1 an MSI packet to arrange a data transfer between EP0 and EP 1 without having to interrupt the RC. For example, EP 0 can correctly access EP 1, based on the provided base address of EP 1 and the pre-defined offsets of at least one interrupt request trigger register from the base address of an endpoint device. Alternatively, the MSI packet 480 may be directly addressed to EP 1's interrupt request trigger register for receiving MSI packets (e.g., 0x1020_0060 or 0x1020_0020).

Special MWr TLP Interrupt from RC to EP 1

In the case of an interrupt from a root complex to an endpoint, for example, RC to EP 1, a special interrupt message is used. The special interrupt message 485*b* may be a normal PCIe memory write request message (MWr TLP). As the RC knows the base address of each endpoint and the offset to the interrupt request trigger register is predefined, the special interrupt message may be an MWr TLP packet directly addressed to the interrupt request trigger register of the target endpoint. When the endpoint device receives the special interrupt message, it simply writes the data value to the indicated address. For example, the MWr TLP packet may be addressed to the interrupt request trigger register of EP 1 (e.g., 0x1020_0060) and contain identification information corresponding to one of a plurality of possible interrupts that can be serviced by EP 1. At EP 1, the MWr TLP packet is treated like any other MWr TLP packet. That is, the data value contained therein is written to memory space at the address indicated therein. The RC has to use a MWr TLP message because the PCIe specification does not provide MSI/MSI-X interrupt messages for root complexes.

Alternatively, for example, for uniformity, the RC may send an MWr TLP formatted like an MSI interrupt message. That is, the MWr TLP may be formatted in a manner similar to the structure of an MSI interrupt message. For example, it may contain a data value identifying one of a plurality of possible interrupts that can be serviced by the endpoint device, be addressed to the base address of the PCIe device processing the interrupt message, and may include an extra field indicating that it is request trigger packet to differentiate from a general packet. When a PCIe controller receives a memory write request packet, it must determine whether it is a request trigger packet. If it is a request trigger packet, it may locate the interrupt request trigger register in a manner similar to a host device locating an MSI/MSI-X register of an RC. For example, the RC may generate an MWr TLP based interrupt message 485*b* addressed to the base address of EP 1 and may include an indication that it is a request trigger interrupt write request. EP 1 may detect that the MWr TLP packet is a request trigger interrupt write request and EP 1 can locate the interrupt request trigger register based on pre-defined offsets of the interrupt request trigger register from the base address of the endpoint device and write the received data value to the interrupt request trigger register.

Alternatively, for example, for purposes of special interrupt handling, the RC may maintain a separate memory table that may include for each endpoint with special interrupt handling an address pointer to the single interrupt request trigger register or to the separate MWr TLP interrupt request trigger register, MSI interrupt request trigger register, and MSI-X interrupt request trigger register of the particular endpoint device.

Processing of Interrupt Message

When an endpoint receives an interrupt message (e.g., MWr TLP, MSI, MSI-X), the endpoint may decode the interrupt message in manner described herein with respect to the evaluation logic circuitry. Once the endpoint determines which one of a plurality of interrupt lines (e.g., 16) is being signaled, it can signal the interrupt routine handler circuitry.

Additionally or alternatively, when an endpoint receives an interrupt request message (e.g., MWr TLP, MSI, MSI-X), the endpoint may handle the interrupt request message in a manner similar to how a root complex would handle an MSI interrupt message pursuant to the PCIe specification. The endpoint would then determine which particular one of a plurality of interrupt lines (e.g. 32) is being signaled and signals the interrupt routine handler circuitry.

The advantages of the present disclosure include ease of implementation, compatibility with all PCIe devices, does not require hardware changes to PCIe devices that only want to trigger interrupts. The request trigger mechanism is simple to implement because it only requires a single register and some combinatorial logic. The request trigger mechanism is usable for all PCIe devices, since the functionality is mapped to the PCIe memory space. The request trigger mechanism is optional and would only require additional hardware in PCIe devices that seek to provide endpoint interrupt reception and processing. No additional hardware is needed for an RC or EP that only wants to trigger interrupts in an EP with the request trigger mechanism. Only software changes would be needed. The request trigger mechanism is congruent with existing PCIe mechanisms and is able to provide endpoint interrupt reception by repurposing various existing PCIe mechanisms. For example, it is based on an extension and remapping of existing PCIe mechanisms to achieve a completely new function. This congruency makes the invention easy to use and understand.

FIG. 6 is a flow diagram of an interrupt reception process 600 of a PCIe controller in accordance with various aspects of the present disclosure. At 610, a PCIe controller may receive, from a PCIe link interface, an interrupt request message, wherein the interrupt request message is a message write transaction PCIe transport layer packet (TLP) including an address associated with the PCIe endpoint device and a data value. At 620, the PCIe controller may receive, into an interrupt request trigger register associated with the PCIe endpoint device, the data value. At 630, the PCIe controller may decode a plurality of data bits of the data value received into the interrupt request trigger register and generate an interrupt signal on one of a plurality of interrupt lines to an interrupt handling circuit.

FIG. 7 is a flow diagram of an interrupt signaling process 700 of a PCIe device in accordance with various aspects of the present disclosure. At 710, the PCIe device generates, by a processor, an interrupt request message to an PCIe endpoint device, wherein the interrupt request message is a message write transaction PCIe transport layer packet (TLP) including an address associated with the PCIe endpoint device and a data value to be written to an interrupt request trigger register of the PCIe endpoint device. At 720, the PCIe device transmits, via a PCIe link interface, the interrupt request message to the PCIe endpoint device.

FIG. 8 is a flow diagram of a memory map configuration process 800 of a PCIe root complex device in accordance with various aspects of the present disclosure. At 810, the PCIe root complex device identifies each of the PCIe endpoint devices on the bus. At 820, the PCIe root complex generates, for each PCIe endpoint device, a configuration message to obtain, from a base register of a respective PCIe endpoint device, information about a memory-mapped address space associated with the respective PCIe endpoint device. At 830, the PCIe root complex device transmits, to each PCIe endpoint device, the configuration message over a PCIe link interface. At 840, the PCIe root complex device reserves, for each PCIe endpoint device, a respective range of system address space for the memory-mapped address space associated with each respective PCIe endpoint device. At 850, the PCIe root complex device determines, for each PCIe endpoint device, whether the respective PCIe endpoint device includes a respective interrupt request trigger register. At 860, the PCIe endpoint device associates, for each PCIe endpoint device having the respective interrupt request trigger register, a respective address in said respective range of system address space to the respective PCIe endpoint device, wherein the respective address corresponds to the respective interrupt request trigger register of the respective PCIe endpoint device.

Figure 5:
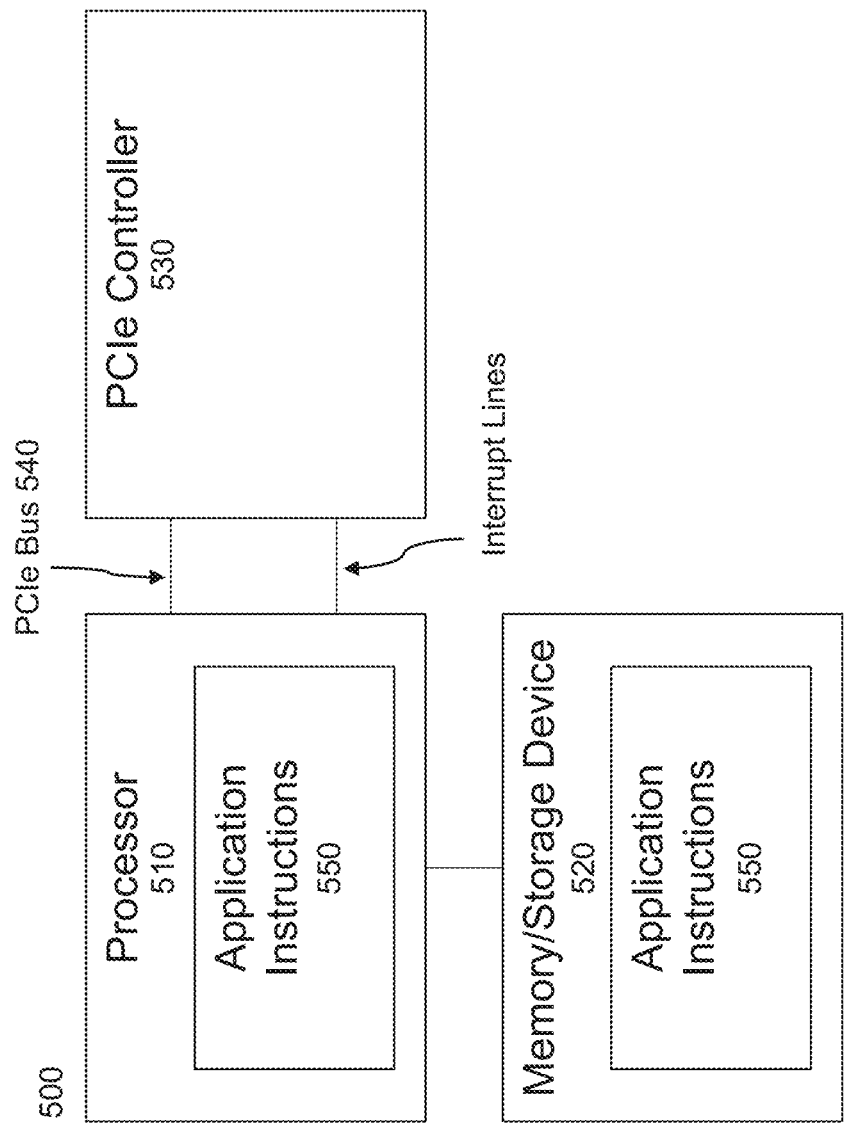
FIG. 5 is a block diagram illustrating components, according to some example embodiments, able to read instructions from a machine-readable or computer-readable medium (e.g., a non-transitory machine-readable storage medium) and perform any one or more of the methodologies discussed herein.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more PCIe resources 530. The one or more processors 510 may be communicatively coupled to the one or more PCIe resources 530 via PCIe bus 540.

The processors 510 may include, for example, a processor 512 and a processor 514. The processor(s) 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The PCIe resources 530 may include interconnection or network interface components or other suitable devices to communicate with one or more peripheral devices 504 or one or more databases 506 via a network 508.

Instructions 550 may include software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example 1 is a Peripheral Component Interconnect Express (PCIe) controller for a PCIe endpoint device, the PCIe controller includes: a PCIe link interface configured to receive an interrupt request message, wherein the interrupt request message is a message write transaction PCIe transport layer packet (TLP) including an address associated with the PCIe endpoint device and a data value including interrupt information; an interrupt request trigger register configured to receive the data value; a plurality of interrupt lines; and a decode logic circuit connected to the interrupt request trigger register and the plurality of interrupt lines, the decode logic circuit configured to automatically decode a plurality of data bits of the data value when received in the interrupt request trigger register and generate an interrupt signal and provide the interrupt signal on one of the plurality of interrupt lines to an interrupt handling circuit.

Example 2 may include the PCIe controller of Example 1, wherein the interrupt request trigger register is configured to be in writable memory space and to have an address in a memory-mapped address space associated with the PCIe endpoint device.

Example 3 may include the PCIe controller of Example 2, wherein the interrupt information includes an interrupt index identifying one of the plurality of interrupt lines of a respective PCIe endpoint device for triggering.

Example 4 may include the PCIe controller of Example 3, wherein the interrupt index also identifies a PCIe device sending the interrupt request message.

Example 5 may include the PCIe controller of any one of Examples 1 to 4, wherein the interrupt request trigger register is a request trigger register.

Example 6 may include the PCIe controller of any one of Examples 1 to 5, wherein the decode logic circuit includes a combinatorial logic circuit and/or a bit control logic circuit.

Example 7 may include the PCIe controller of any one of Examples 1 to 6, further including a base address register configured to define the memory-mapped address space associated with the PCIe endpoint device.

Example 8 may include the PCIe controller of Example 7, wherein the base address register includes information about a size of the memory-mapped address space or information about a base address of the memory-mapped address space, and wherein the memory-mapped address space is a portion of a system memory address space.

Example 9 may include the PCIe controller of any of Examples 1 to 7, wherein the interrupt request message is received from another PCIe endpoint device or a PCIe root complex device.

Example 10 may include the PCIe controller of any one of Examples 1 to 7, wherein the interrupt request message is formatted as a Message Signal Interrupt (MSI) message, MSI-X message, or a Memory Write (MWr) message.

Example 11 may include the PCIe controller of any of Examples 1 to 10, wherein the interrupt handling circuit is a processor of the PCIe endpoint device.

Example 12 is a Peripheral Component Interconnect Express (PCIe) device including: a processor configured to generate an interrupt request message to a PCIe endpoint device, wherein the interrupt request message is a memory write transaction PCIe transport layer packet (TLP) including an address associated with the PCIe endpoint device and a data value including interrupt information to be written to an interrupt request trigger register of the PCIe endpoint device; and a PCIe link interface configured to transmit the interrupt request message to the PCI end point device.

Example 13 may include the PCIe device of Example 12, wherein the PCIe device is another PCIe endpoint device or a PCIe root complex device.

Example 14 may include the PCIe device of Example 13, wherein the interrupt request message is formatted as a Message Signal Interrupt (MSI) message, MSI-X message, or a Memory Write (MWr) message.

Example 15 may include the PCIe device of Example 13, wherein the interrupt information includes an interrupt index identifying one of a plurality of interrupt lines of the PCIe endpoint device for triggering and wherein the interrupt index also identifies the PCIe device.

Example 16 is a Peripheral Component Interconnect Express (PCIe) root complex device including: a PCIe link interface configured to receive and transmit configuration messages; and a processor configured to: generate, for each PCIe endpoint device, a configuration message to obtain, from a base register of a respective PCIe endpoint device, information about a memory-mapped address space associated with the respective PCIe endpoint device; reserve, for each PCIe endpoint device, a respective range of system address space for the memory-mapped address space associated with each respective PCIe endpoint device; determine, for each PCIe endpoint device, whether the respective PCIe endpoint device includes a respective interrupt request trigger register; associate, for each PCIe endpoint device having the respective interrupt request trigger register, a respective address in said respective range of system address space to the respective PCIe endpoint device, wherein the respective address corresponds to the respective interrupt request trigger register of the respective PCIe endpoint device.

Example 17 may include the PCIe root complex device of Example 16, wherein the processor is further configured to: determine, for the PCIe root complex device and each PCIe endpoint device, a respective unique set of interrupt indices; and communicating, to each PCIe endpoint device, each of the respective unique sets of interrupt indices.

Example DA1 is a Peripheral Component Interconnect Express (PCIe) controller for a PCIe endpoint device. The PCIe controller includes: an interrupt request trigger register configured to be in writable memory space; a PCIe link interface configured to receive an interrupt request message, wherein the interrupt request message is a message write transaction PCIe transport layer packet (TLP) including an address associated with the PCIe endpoint device and a data value to be written to the interrupt request trigger register; and a decode logic circuit configured to decode a plurality of data bits of the data value written to the interrupt request trigger register and generate an interrupt signal and provide the interrupt signal on one of a plurality of interrupt lines to an interrupt handling circuit.

Example DA2 may include the PCIe controller of Example DA1, wherein the interrupt request trigger register is configured to have an address in a memory-mapped address space associated with the PCIe endpoint device.

Example DA3 may include the PCIe controller of any one of Examples DA1 to DA2, wherein the interrupt request trigger register is a PCIe Message Signaled Interrupt (MSI) register.

Example DA4 may include the PCIe controller of any one of Examples DA1 to DA3, wherein the interrupt request trigger register is a request trigger register.

Example DA5 may include the PCIe controller of any one of Examples DA1 to DA4, further including a base address register configured to define the memory-mapped address space associated with the PCIe endpoint device.

Example DA6 may include the PCIe controller of any one of Examples DA1 to DA5, wherein the decode logic circuit includes a combinatorial logic circuit and/or a bit control logic circuit.

Example DA7 may include the PCIe controller of Example DA5, wherein the base address register includes information about a size of the memory-mapped address space or information about a base address of the memory-mapped address space, and wherein the memory-mapped address space is a portion of a system memory address space.

Example DA8 may include the PCIe controller of any of Examples DA1 to DA5, wherein the interrupt request message is received from another PCIe endpoint device or a PCIe root complex device.

Example DA9 may include the PCIe controller of any one of Examples DA1 to DA5, wherein the interrupt request message is formatted as a Message Signal Interrupt (MSI) message, MSI-X message, or a Memory Write (MWr) message.

Example DA10 may include the PCIe controller of any of Examples DA1-DA8, wherein the interrupt handling circuit is a processor of the PCIe endpoint device.

Example DA11 may include the PCI controller of any of Examples DA1-DA10, wherein the data value includes an interrupt index identifying one of the plurality of interrupt lines of a respective PCIe endpoint device for triggering.

Example DA12 may include the PCI controller of Example DA11, wherein the interrupt index also identifies a PCIe device sending the interrupt request message.

Example DB1 is a Peripheral Component Interconnect Express (PCIe) device including: a processor configured to generate an interrupt request message to a PCIe endpoint device, wherein the interrupt request message is a memory write transaction PCIe transport layer packet (TLP) including an address associated with the PCIe endpoint device and a data value including interrupt information to be written to an interrupt request trigger register of the PCIe endpoint device; and a PCIe link interface configured to transmit the interrupt request message.

Example DB2 may include the PCIe device of Example DB1, wherein the PCIe device is another PCIe endpoint device or a PCIe root complex device.

Example DB3 may include the PCIe device of Examples DB1 or DB2, wherein the interrupt request message is formatted as a Message Signal Interrupt (MSI) message, MSI-X message, or a Memory Write (MWr) message.

Example DB4 may include the PCIe device of Examples DB1 to DB3, wherein the interrupt information includes an interrupt index identifying one of a plurality of interrupt lines of the PCIe endpoint device for triggering and wherein the interrupt index also identifies the PCIe device.

Example DC1 is a Peripheral Component Interconnect Express (PCIe) root complex device including: a PCIe link interface configured to receive and transmit configuration messages; and a processor configured to: generate, for each PCIe endpoint device, a configuration message to obtain, from a base register of a respective PCIe endpoint device, information about a memory-mapped address space associated with the respective PCIe endpoint device; reserve, for each PCIe endpoint device, a respective range of system address space for the memory-mapped address space associated with each respective PCIe endpoint device; determine, for each PCIe endpoint device, whether the respective PCIe endpoint device includes a respective interrupt request trigger register; associate, for each PCIe endpoint device having the respective interrupt request trigger register, a respective address in said respective range of system address space to the respective PCIe endpoint device, wherein the respective address corresponds to the respective interrupt request trigger register of the respective PCIe endpoint device.

Example DC2 may include the PCIe root complex device of Example DC1, wherein the processor is further configured to identify one or more PCIe endpoint devices connected to the PCIe root complex device.

Example DC3 may include the PCIe root complex device of any one of Examples DC1 or DC2, wherein the processor is further configured to provide the respective address of the respective PCIe endpoint device to another one of the one or more PCIe endpoint devices.

Example DC4 may include the PCIe root complex device of any one of Examples DC1 to DC3, wherein the processor is further configured to: determine, for the PCIe root complex device and each PCIe endpoint device, a respective unique set of interrupt indices; and communicating, to each PCIe endpoint device, each of the respective unique sets of interrupt indices.

Example MA1 is a method for a Peripheral Component Interconnect Express (PCIe) controller of a PCIe endpoint device, the method including: receiving, from a PCIe link interface, an interrupt request message, wherein the interrupt request message is a message write transaction PCIe transport layer packet (TLP) including an address associated with the PCIe endpoint device and a data value including interrupt information; writing, to an interrupt request trigger register associated with the PCIe endpoint device, the data value; and decoding a plurality of data bits of the data value received in the interrupt request trigger register and generate an interrupt signal and providing the interrupt signal on one of a plurality of interrupt lines to an interrupt handling circuit.

Example MA2 may include the method of Example MA1, wherein when the data value is written to the interrupt request trigger register, the data value is automatically decoded using combinatorial logic circuit and/or a bit control logic circuit.

Example MA3 may include the method of Example MA1 or MA2, further including: configuring the base address register to include information about a size of the memory-mapped address space or information about a base address of the memory-mapped address space, wherein the memory-mapped address space is a portion of a system memory address space.

Example MA4 may include the method of any of Examples MA1 to MA3, further includes: automatically executing, by the interrupt handling circuit, one or more interrupt routines for each of the respective the one or more interrupt signals corresponding to one or more interrupt requests of the interrupt request message.

Example MA5 may include the method of any of Examples MA1 to MA4, wherein the interrupt request message is received from another PCIe endpoint device or a PCIe root complex device.

Example MA6 may include the method of any of Examples MA1 to MA5, wherein the interrupt request message is formatted as a Message Signal Interrupt (MSI) message, MSI-X message, or a Memory Write (MWr) message.

Example MA7 may include the method of Example MA4 and any one of Examples MA2, MA3, MA5, and MA6, wherein the interrupt handling circuit is a processor of the PCIe endpoint device.

Example MB1 is a method of a Peripheral Component Interconnect Express (PCIe) device including: generating, by a processor, an interrupt request message to an PCIe endpoint device, wherein the interrupt request message is a message write transaction PCIe transport layer packet (TLP) including an address associated with the PCIe endpoint device and a data value including interrupt information to be written to an interrupt request trigger register of the PCIe endpoint device; transmitting, via a PCIe link interface, the interrupt request message to the PCIe endpoint device.

Example MB2 may include the method of Example MB1, wherein the PCIe device is another PCIe endpoint device or a PCIe root complex device.

Example MB3 may include the method of Example MB1 or MB2, wherein the interrupt request message is formatted as a Message Signal Interrupt (MSI) message, MSI-X message, or a Memory Write (MWr) message.

Example MB4 may include the method of Example MB1, wherein the interrupt information includes an interrupt index identifying one of a plurality of interrupt lines of the PCIe endpoint device for triggering and wherein the interrupt index also identifies the PCIe device.

Example MC1 is a method of a Peripheral Component Interconnect Express (PCIe) root complex device connected to a plurality of PCIe endpoint devices, including: identifying each of the PCIe endpoint devices; generating, for each PCIe endpoint device, a configuration message to obtain, from a base register of a respective PCIe endpoint device, information about a memory-mapped address space associated with the respective PCIe endpoint device; transmitting, to each PCIe endpoint device, the configuration message over a PCIe link interface; reserving, for each PCIe endpoint device, a respective range of system address space for the memory-mapped address space associated with each respective PCIe endpoint device; determining, for each PCIe endpoint device, whether the respective PCIe endpoint device includes a respective interrupt request trigger register; and associating, for each PCIe endpoint device having the respective interrupt request trigger register, a respective address in said respective range of system address space to the respective PCIe endpoint device, wherein the respective address corresponds to the respective interrupt request trigger register of the respective PCIe endpoint device.

Example MC2 may include the Example of MC1, further including: providing the respective address of the respective PCIe endpoint device to another one of the plurality of PCIe endpoint device.

Example MC3 may include any one of Examples MC1 or MC2, further including determining, for the PCIe root complex device and each PCIe endpoint device, a respective unique set of interrupt indices; and communicating, to each PCIe endpoint device, each of the respective unique sets of interrupt indices.

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

What is claimed is:

1. A Peripheral Component Interconnect Express (PCIe) controller for a PCIe endpoint device, the PCIe controller comprises:
    a PCIe link interface configured to receive an interrupt request message, wherein the interrupt request message is a message write transaction PCIe transport layer packet (TLP) including an address associated with the PCIe endpoint device and a data value including interrupt information;
    an interrupt request trigger register configured to receive the data value;
    a plurality of interrupt lines; and
    a decode logic circuit connected to the interrupt request trigger register and the plurality of interrupt lines, the decode logic circuit configured to automatically decode a plurality of data bits of the data value when received in the interrupt request trigger register and generate an interrupt signal and provide the interrupt signal on one of the plurality of interrupt lines to an interrupt handling circuit.

2. The PCIe controller of claim 1, wherein the interrupt request trigger register is configured to be in writable memory space and to have an address in a memory-mapped address space associated with the PCIe endpoint device.

3. The PCIe controller of claim 2, wherein the interrupt information includes an interrupt index identifying one of the plurality of interrupt lines of a respective PCIe endpoint device for triggering.

4. The PCIe controller of claim 3, wherein the interrupt index also identifies a PCIe device sending the interrupt request message.

5. The PCIe controller of claim 1, wherein the interrupt request trigger register is a request trigger register.

6. The PCIe controller of claim 1, wherein the decode logic circuit includes a combinatorial logic circuit and/or a bit control logic circuit.

7. The PCIe controller of claim 2, further including a base address register configured to define the memory-mapped address space associated with the PCIe endpoint device.

8. The PCIe controller of claim 7, wherein the base address register includes information about a size of the memory-mapped address space or information about a base address of the memory-mapped address space, and wherein the memory-mapped address space is a portion of a system memory address space.

9. The PCIe controller of claim 1, wherein the interrupt request message is received from another PCIe endpoint device or a PCIe root complex device.

10. The PCIe controller of claim 1, wherein the interrupt request message is formatted as a Message Signal Interrupt (MSI) message, MSI-X message, or a Memory Write (MWr) message.

11. The PCIe controller of claim 1, wherein the interrupt handling circuit is a processor of the PCIe endpoint device.

12. The PCIe controller of claim 1, wherein the interrupt request trigger register is a PCIe Message Signaled Interrupt (MSI) register.

13. A Peripheral Component Interconnect Express (PCIe) device comprising:
a processor configured to generate an interrupt request message to a PCIe endpoint device, wherein the interrupt request message is a memory write transaction PCIe transport layer packet (TLP) including an address associated with the PCIe endpoint device and a data value including interrupt information to be written to an interrupt request trigger register of the PCIe endpoint device, wherein the interrupt information includes an interrupt index identifying one of a plurality of interrupt lines of the PCIe endpoint device for triggering; and a PCIe link interface configured to transmit the interrupt request message to the PCIe endpoint device.

14. The PCIe device of claim 13, wherein the PCIe device is another PCIe endpoint device or a PCIe root complex device.

15. The PCIe device of claim 13, wherein the interrupt request message is formatted as a Message Signal Interrupt (MSI) message, MSI-X message, or a Memory Write (MWr) message.

16. The PCIe device of claim 13, wherein the interrupt index also identifies the PCIe device.

17. A Peripheral Component Interconnect Express (PCIe) root complex device comprising:
a PCIe link interface configured to receive and transmit configuration messages; and
a processor configured to:
generate, for each PCIe endpoint device, a configuration message to obtain, from a base register of a respective PCIe endpoint device, information about a memory-mapped address space associated with the respective PCIe endpoint device;
reserve, for each PCIe endpoint device, a respective range of system address space for the memory-mapped address space associated with each respective PCIe endpoint device;
determine, for each PCIe endpoint device, whether the respective PCIe endpoint device includes a respective request trigger register; and
associate, for each PCIe endpoint device having the respective request trigger register, a respective address in said respective range of system address space to the respective PCIe endpoint device, wherein the respective address corresponds to the respective request trigger register of the respective PCIe endpoint device.

18. The PCIe root complex device of claim 17, wherein the processor is further configured to:
determine, for the PCIe root complex device and each PCIe endpoint device, a respective unique set of interrupt indices; and
communicate, to each PCIe endpoint device, each of the respective unique sets of interrupt indices.

19. The PCIe root complex device of claim 17, wherein the processor is further configured to identify one or more PCIe endpoint devices connected to the PCIe root complex device.

20. The PCIe root complex device of claim 19, wherein the processor is further configured to provide the respective address of the respective PCIe endpoint device to another one of the one or more PCIe endpoint devices.

* * * * *